(12) United States Patent
Johansson

(10) Patent No.: US 9,654,431 B1
(45) Date of Patent: May 16, 2017

(54) AUTOMATED EMAIL ACCOUNT VERIFICATION

(71) Applicant: Amazon Technologies, Inc., Seattle, WA (US)

(72) Inventor: Jesper Mikael Johansson, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 147 days.

(21) Appl. No.: 14/298,564

(22) Filed: Jun. 6, 2014

(51) Int. Cl.
*H04L 12/58* (2006.01)
*H04L 29/06* (2006.01)

(52) U.S. Cl.
CPC .............. *H04L 51/12* (2013.01); *H04L 63/08* (2013.01)

(58) Field of Classification Search
CPC ....................................................... H04L 51/12

USPC ............................................................ 726/4
See application file for complete search history.

(56) References Cited

U.S. PATENT DOCUMENTS

2006/0253597 A1* 11/2006 Mujica .......................... 709/229

* cited by examiner

*Primary Examiner* — Jacob Lipman
(74) *Attorney, Agent, or Firm* — Lindauer Law, PLLC

(57) ABSTRACT

A system and method of verifying a registered contact path associated with a user account is provided. The disclosed techniques utilize a message sent via the registered contact path, wherein the message contains, among other content, a link. The link is instrumented to identify the registered contact path when activated, e.g., by the recipient or otherwise, allowing a determination as to whether the registered contact path is active. User login data for the user account received subsequently includes a login contact path, and the registered contact path may be further flagged as verified if it is determined that the login contact path and the registered contact path are the same.

20 Claims, 10 Drawing Sheets

AUTOMATED EMAIL ACCOUNT VERIFICATION

BACKGROUND

Online transactions have overtaken in-person transactions in many areas of commerce, to the point that even automobiles may now be purchased online. Indeed, an increasing number of services and products are available only online, e.g., downloadable ebooks and music content, news services, data services, and so on. Moreover, far from being the anonymous interconnector that many thought it would be, the Internet has demonstrated an ability to build relationships and serve repeat customers with customized content.

However, one long-standing difficulty presented in maintaining online connections is ensuring that a contact path to a known entity, e.g., a contact path to a customer, remains known. For example, a customer may be identified by his or her email address, and as long as that email address remains the same, the connection to that customer remains stable. However, if that email address changes, the connection becomes lost or unreliable. This compromised connection may result in loss of the customer relationship, and can also give rise to security vulnerabilities.

BRIEF DESCRIPTION OF THE DRAWINGS

For a more complete understanding of the disclosed methods and apparatuses, reference should be made to the embodiments illustrated in greater detail in the accompanying drawings, wherein.

Figure 1:
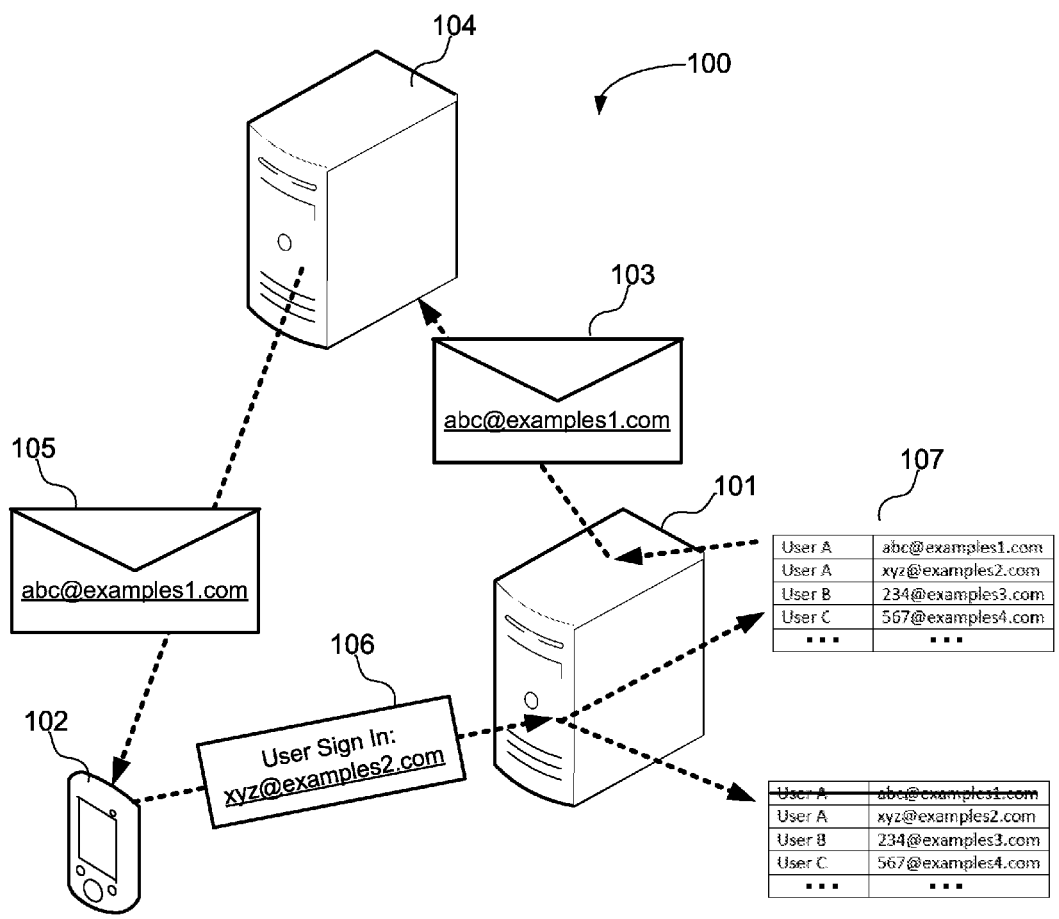
FIG. 1 is a simplified transactional diagram showing messaging in accordance with an embodiment of the described principles.

It should be understood that the disclosed embodiments are sometimes illustrated diagrammatically and in partial views and that details which are not necessary or useful for an understanding of the disclosed methods and apparatuses may be omitted. It should be understood, of course, that the principles of this disclosure are not limited to the specific embodiments illustrated herein.

DETAILED DESCRIPTION

Before proceeding with a detailed discussion of the figures, a brief overview will be provided in order to aid the reader's understanding. It is useful, and sometimes important from a relationship or security standpoint, to ensure that customer contact paths or communication channels, such as email messages to preconfigured email addresses, phone calls to preconfigured telephone numbers, text messages to preconfigured telephone numbers, instant messages to instant messaging addresses, and messages (e.g., 140-character text messages) to social networking accounts/addresses, are kept up to date. Put another way, the prompt discovery of out-of-date contact paths can allow the operator, e.g., an ecommerce vendor, to rekindle lost relationships through new contact paths while helping to avoid security risks stemming from unauthorized access through stale paths (e.g., sending a password reset email or text message to a customer's out-of-date email address or cell phone number that is still on file—especially if the email address or cell phone number has already been reassigned to a different individual).

It is common to verify a contact path such as an email address when a user first registers an account. In particular, a web site may perform an email validation or SMS validation when a user first registers an account. This validation may involve sending a code to the registered email address or phone number for the user to input during the registration process. Nonetheless, email addresses and phone numbers can change or get reassigned, opening up a potential security vulnerability for sites that use the email addresses or phone numbers to identify users.

As such, it is useful to revalidate registered email addresses or phone numbers. To this end, it is possible in theory to probe contact paths continuously to ensure that they remain valid. However, from a commercial standpoint, the security benefits gained by this approach might be negated by the additional burden on the user resulting from frequent validation requests.

In various embodiments of the disclosed principles, verification of contact paths is provided without undue user burden and without sending additional unwanted emails to the user, while also not allowing invalid contact paths to remain registered. For example, in an embodiment, an email of interest from an operator is modified to contain an instrumented link to a known email address for a registered user. The instrumented link is a visual link in the message that may be clicked on by the recipient or otherwise activated, and that will convey to the sending operator that the link was activated (and, directly or indirectly, from which email address). In this way, the operator is apprised of which email addresses are still active addresses.

For example, within this embodiment, as part of sending marketing emails to customers, the operator can include in the emails a link (e.g., "Tablet on sale today. Click here to buy!") that is instrumented with an identifier or the operator can instrument an existing link. If the customer clicks on the link or it is otherwise activated, an indication of that activation is recorded.

In a further embodiment, the activation of the instrumented link opens a landing page in the user's browser, within which the user may log in using a login email address. If the user chooses to log in, the login email address is compared to a known email address from which the instrumented link was activated. If these addresses match, the operator can infer not only that the registered email address is active but also that the registered email address is still associated with the registered user in question. Although additional details and embodiments will be described herein, the foregoing brief example may better enable the reader to follow the detailed description.

Turning now more specifically to the drawing figures, FIG. 1 is a simplified transactional diagram showing messaging in accordance with an embodiment of the described principles. In particular, FIG. 1 illustrates an operator server 101 operating in conjunction with a mail server 104 and a user device 102 to verify a registered user email address. The operator may be an ecommerce vendor, for example, wishing to validate email addresses registered to customer accounts of the vendor.

In this way, the vendor can be assured that email solicitation rules are being followed, that direct marketing waste is minimized, and that each registered customer is being reached with advertisements, updates, special offers, and so on. In addition, if the vendor allows users to access its system via their email addresses, then the deregistration of out-of-date email addresses will minimize the number of opportunities for unauthorized access when email addresses become reassigned.

To begin the email address verification process, one or more users and their associated registered email addresses are chosen at the operator server 101 for verification. In an embodiment, this choice is made automatically at the operator server 101 or at another computing device in communication with the operator server 101. The basis upon which the one or more email addresses are selected for verification may be any suitable basis, but in an embodiment the amount of time elapsed since registration or since a prior verification is used to trigger verification. For example, all email addresses that were last verified more than six months prior may be selected for verification.

In an alternative embodiment, the type or amount of content associated with an account may be used as the basis upon which to trigger verification. For example if the type of content associated with an account is sensitive data (e.g., financial data, personal data, etc.), then verification may be deemed more desirable. Similarly, an account having large amounts of content associated therewith may pose a heightened risk of loss in the event of a security lapse. The type or amount of content used to trigger verification may be reflected in a type listing or an amount threshold, respectively. Moreover, in addition to or instead of triggering immediate verification, the noted triggers or others may be used to establish periodic verification or to increase the frequency of periodic verification.

In the illustrated example, the user accounts selected for verification are shown in the email address listing 107. As can be seen, User A is associated with two registered email addresses, namely abc@examples1.com and xyz@examples2.com. Once the email addresses are selected for verification, the operator server 101 generates or causes to be generated a verification link customized to each email address for inclusion in an email message to be sent to the associated address. In an embodiment, a message that is already intended to be sent to the customer for another purpose is used to carry the link, e.g., a notification of a new coupon, or a notification that an existing coupon will soon expire is used to carry the verification link. In the illustrated message exchange, only the first email address registered for User A is shown being tested for verification, though it will be appreciated that in an embodiment, each selected address is tested sequentially or in parallel.

Figure 2:
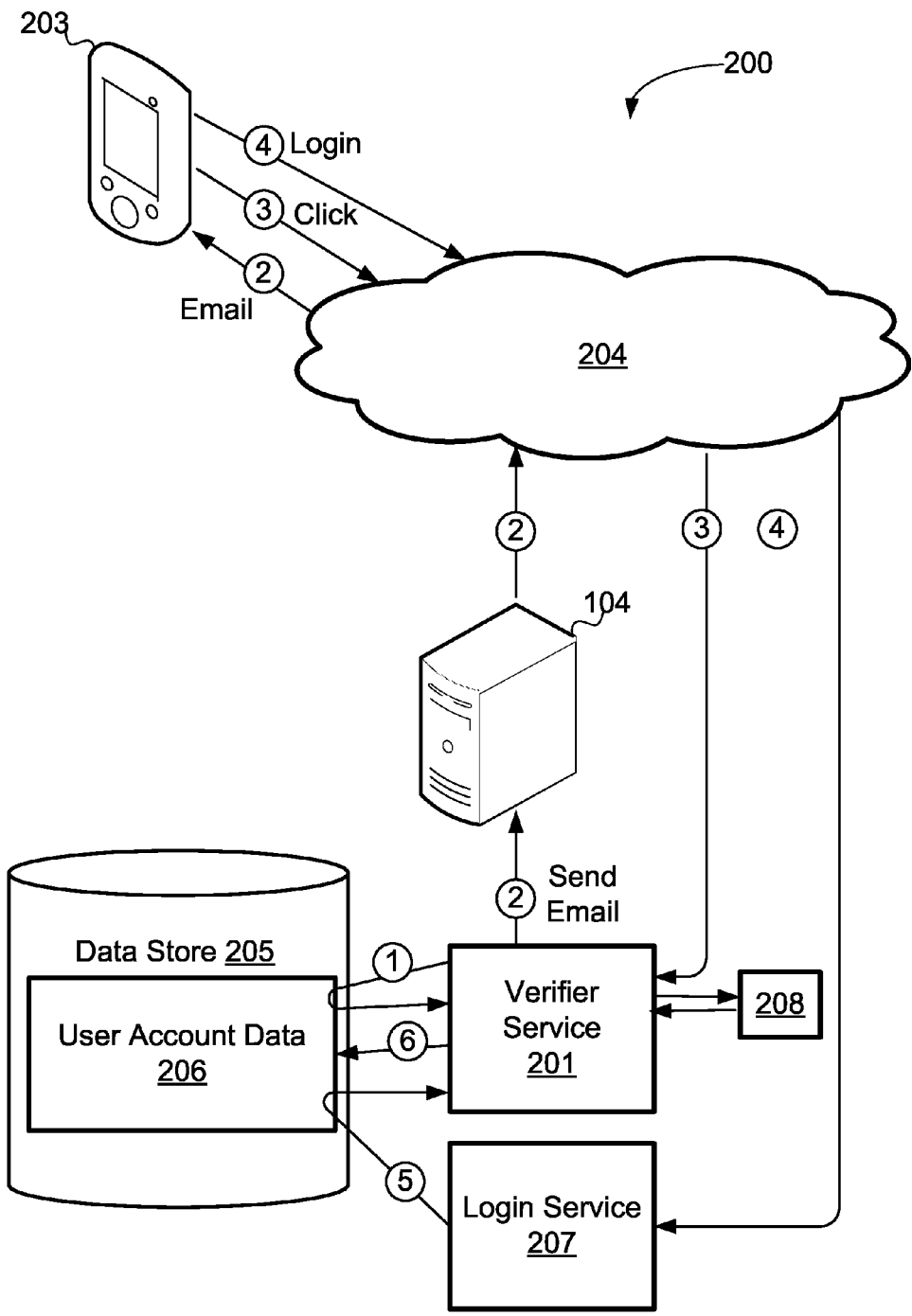
FIG. 2 is a schematic diagram showing message flow and processing examples in accordance with an embodiment of the described principles.

The email message 103, to be described in greater detail shortly by reference to FIG. 2, is emailed by, or caused to be emailed by, the operator server 101, e.g., via email server 104. In the illustrated example, the account being verified (abc@examples1.com) is checked by the user at user device 102, at which time the email message 103 is retrieved from the email server 104.

Although user device 102 is illustrated in the form of a smart phone, it will be appreciated that any computing device having a user interface and being capable of receiving email messages may be used to retrieve the email message 103. In general terms, a suitable device is a device implementing a processor-based system such as a computer system. Such a computer system may be embodied in the form of a desktop computer, a laptop computer, a personal digital assistant, a cellular telephone, a Smartphone, a set-top box, a music player, a web pad, a tablet computer system, a game console, an electronic book reader, or other device with like capability. The user device 102 may include a display. The display may comprise, for example, one or more devices such as a liquid crystal display (LCD) display, a gas plasma-based flat panel display, an organic light emitting diode (OLED) display, an electrophoretic ink (E ink) display, an LCD projector, a 3D display or other type of display device.

The user device 102 may include networking hardware such as one or all of a LAN interface, a WiFi transceiver, and a cellular transceiver or other network interface. It will be appreciated that wireless networking is currently more prevalent in mobile settings, while wired networking remains popular in more static settings, and that the user device 102 may support one or both of wired and wireless networking.

The user device 102 may be configured to execute various logic, or "applications," and/or other executable logic. Such applications may be executed in the client device 102, for example, and be used to access network content provided by services exposed by a service provider computing environment and/or other servers, thereby rendering a user interface on the display. The applications may correspond, for example, to browsers, mobile applications, social networking applications, email applications, shopping applications, productivity applications, media or multi-media applications, etc., and the user interface may correspond to a network page, a mobile application screen, etc.

Again considering the email message 105 retrieved from the email server 104, this message 105 contains a selectable link that is activated by the recipient or otherwise to bring up a landing page, e.g., hosted by the operator server 101, or by another server. Once the link is activated, the email address in question is known to be active. As will be described later, the instrumented link may not contain any actual data that identifies the user in general, but may contain a coded entry that may be decoded by the operator to identify the email address to which the email message was sent. Moreover, the landing page may provide a login screen allowing the recipient, presumably User A in the illustrated example, to log into his or her account with the operator.

When the recipient logs in, they may provide a login email address or phone number, or they may log in using a user name and password allowing the operator to look up an email address or phone number that is registered to the user. In the illustrated example the user has provided a login email address of xyz@examples2.com. This email address does not match the registered email address to which the verification message was sent, and therefore that email address (abc@examples1.com) is flagged as non-matching. However, the login email address does match the second email address registered for User A. As such, this second email address, xyz@examples2.com, can be set as the primary registered email address for User A or User A may be given an option to select which of their email addresses to keep registered. In an embodiment, multiple registered contact paths may be permitted.

In an embodiment, when a registered email address is flagged as non-matching, one or more account features may be disabled. For example, features such as password reset, purchase with prestored credit card, and other features that may compromise or access user or vendor property or security may be disabled. If the email address in question is later verified, e.g., during a periodic verification, then the disabled features may be re-enabled.

In an embodiment, the recipient's use of a different email address to login means that the email addresses are non-matching but does not necessarily indicate that the registered email address is invalid. For example, a user may habitually respond to a vendor's email communications at one address while continuing to use another email address to log into their account with the vendor. If such a pattern is noted by the verifier service, the difference between the login email address and the registered email address (or primary registered email address) may simply be noted and used to direct future communications.

Before moving on, it should be noted that while the examples described in conjunction with FIGS. 1-6 pertain primarily to email address verification, the same principles apply as well to verification via SMS, instant messaging applications, social networks, micro blogs, and other contact path types.

Turning to FIG. 2, this figure illustrates example message flow and processing in greater detail at a service level in accordance with an embodiment of the described principles. The active modules at or accessible to the operator include a verifier service 201 and login service 207. These services may be hosted on one machine such as operator server 101 or may be in different physical locations. A data store 205 is maintained by and provides user account data 206 to the verifier service 201 and login service 207.

In operation, the verifier service 201 retrieves user account data 206 from the data store 205 at transaction 1. This transaction may entail retrieving all available user account data in order to make a determination as to which email addresses to verify, or may instead entail retrieving specific email addresses for accounts for which it has already been determined that verification is needed. In the event that specific email addresses are selected, various methodologies may be used to determine which addresses to verify.

In an embodiment, verification may be performed with all communications sent to customers. In an alternative embodiment, verification is performed on a periodic basis, e.g., once every 3 months or at another predetermined period. In a further nonexclusive embodiment, verification may be performed in response to a customer request at a customer specified time or time interval, e.g., once after a known security breach or twice per year every year. In another nonexclusive embodiment, verification may be performed in response to a system administrator request. Verification may be performed, in a further nonexclusive embodiment, in response to being notified by an email provider (e.g., Gmail, Hotmail) or a telecommunications company that certain email addresses or telephone numbers have expired and/or have been reassigned.

Similarly, in a further nonexclusive embodiment, verification may be performed in response to a service other than the service in question having identified a change in contact information. For example, automatic indexer may flag that the customer's social networking profile or company profile has changed, indicating that the customer may have switched companies, or their social networking page lists different contact information. Within this embodiment, more semantic indicators may also or alternatively be used. For example, a web crawler or other tool may mine public posts for clues such as "I've updated my contact info" or "I've moved jobs" to flag the user likely having a new contact path.

Verification may also be performed in response to predefined externalities; for example, indications of fraud or compromise on certain types of contact mechanisms or from certain ISPs (Internet Service Providers) may trigger contact path verification. The frequency of verification may be selected based on the downside risk presented if the account is compromised, e.g., the services the customer can access using their account, the sensitivity of data associated with their account, and so on. For example, a banking site may verify more frequently than a stock quote site, and an online gaming account where the user has built up game hours may verify more often than one where the user has played only infrequently.

As noted above, the amount of content accessible through an account also affects the size of the risk presented if the account is compromised. Thus, for example, in an embodiment, contact paths for accounts with access to more than a predetermined number or volume of MP3s, ebooks or other data may be verified when that determination is made or at some preselected time or interval.

In a further embodiment, the frequency of verification is chosen based on how often a user logs into his or her account. For example, there may be less certainty as to users that log in infrequently, and as such verification may be performed more frequently for such accounts. In addition, a user's past behavior with respect to proactively updating their own contact information may be taken into account when determining the frequency or timing of verification. For example, with respect to users that have historically kept their contact information up to date, verification may be performed less frequently than for users that have historically not kept their information up to date.

Once it is determined that an email address will be verified, the email message for carrying the instruments link may be generated in a number of ways. For example, in an embodiment the verification is performed using an email message that is already planned to be sent (e.g., in a message queue of an outgoing message provider), in which case the verifier service 201 may contact an email targeting service to modify the already-planned email message (or request that it be modified) so that the customer's email address can be verified. Alternatively, if an email message is not otherwise being sent to the customer, the verifier service 201 may generate or request that another service generate a customized verification email message (e.g., generate an email message to send a custom coupon for a product that is in the customer's shopping cart or for a product that the customer is likely to want based on a recommendation engine or the like, or send a custom electronic gift card).

Instrumenting the link to identify the user or their email address may be accomplished by including a property associated with the user or their email address in the link. The property may be visible or hidden and may be in the clear or coded. In an embodiment, the property is visible and is displayed as part of the link for purposes of transparency, but the property may also be encoded, e.g., via a hash or three-tuple. The three-tuple may, for example, associate a message ID with a User ID and with a registered email address for the account associated with that User ID. In this way, the user's privacy remains protected but the operator is able to decode the property to identify active email addresses.

Once the verifier service 201 has instrumented a message for a particular email address, it sends the message, or causes the message to be sent, in transaction 2. As will be appreciated, the message may be sent to the targeted email account through the sender's internet service provider (ISP) by way of the user's ISP, from which the user device 203 may retrieve the message, e.g., via network 204. It will be appreciated that email messages may be pushed to or pulled by user device 203, and that the precise mode and mechanism of delivery of the email message are well known in the art and have been omitted for conciseness.

Upon receipt or retrieval of the verification message, the user of the device 203 may select or otherwise activate the instrumented link in the message, resulting in a notification in transaction 3 to the verifier service 201 that the email address being verified is active. As shown, the verifier service 201 may employ a three-tuple 208 (linking property code, email address, and user ID) to decode the link property. Activation of the link may also cause delivery, not shown, of a landing page to the user device 203 for display. In an embodiment, the landing page provides a login screen for the user to log into their account using a login email address as identification.

Thus, the user may log in (transaction 4) by filling in appropriate data fields, e.g., login email address and password. This information is conveyed to the login service 207 in order to execute the actual login via a check (transaction 5) against stored user account data. In this transaction, the user-supplied login data is also supplied to the verifier service 201.

Given the user-supplied login email address and the registered email address for the user, the verifier service 201 compares the email addresses and determines whether the registered email address is fully verifiable. With respect to the mechanics of the comparison, the verifier service 201 may have retained the records it retrieved in order to instrument the emailed links, and thus is aware of which email address is registered to which user. As such, when a user logs in with an email address, the comparison between addresses is easily made. If the user logs in with a user name and password, then the only known email address is the one already known to the verifier service 201 from generating the verification message. Depending upon the volume and timing of instrumented email messages sent and logins expected, the verifier service 201 may process such logins as they are received or periodically as a batch process.

With respect to the matching process itself, a match between email addresses may be deemed to occur when two email addresses exactly match when compared in some form such as, for example, clear text or hash form. However, in some embodiments, something less than an exact match may also be deemed a sufficient match. For example, in an embodiment, an email domain match coupled with a sufficient partial match of the email address name may be deemed a match. An instance of this would be the two email addresses Johnathan.Doe@example_email1.com and Jon.Doe@example_email1.com. As can be seen, each character of the second email address name is within the first email address name. In the event of a partial match such as this, an additional query is optionally performed in an alternative database to verify or increase the confidence level that the two email addresses do indeed correspond to the same entity.

Similarly, an exact email address name match and a partial email address domain match may be deemed a sufficient match, such as represented by the example email addresses: Johnathan.Doe@example_email1.com and Johnathan.Doe@example_email2.com.

In cases where a partial match is accepted, it may nonetheless be desired to limit account access with respect to critical or important account features until further verification can be performed. For example, in an embodiment, while a partial match allows all contact paths to remain usable, only the registered contact path may be usable for certain account functions such as password changes, access to or alteration of payment instrument data, purchase history data, wish list information, physical address data, and other private or personally identifying information.

If the user-supplied login email address and the registered email address for the user are deemed to match, then the verifier service 201 determines that the registered email address is valid, and, in an embodiment, sets the next verification at a predefined interval, e.g., three months. If the user-supplied login email address and the registered email address for the user do not match, or even partially match in an implementation wherein a partial match is allowed, then the verifier service 201 flags the registered email address as non-matching.

In the latter case, the verifier service 201 may message the data store 205 (transaction 6) that the registered email address just tested is not a match for the login email address for the same user. In an embodiment, this results in disabling of the password reset feature of the account, a feature wherein a user who forgets their password could ordinarily have a password reset email address or SMS to their email address on file. Alternatively, a more restrictive password reset regimen may be required, e.g., wherein portions of a required code are transmitted to the user's friends, whom the user must contact to obtain the full code and hence gain access to their account. Alternatively or additionally, marketing email messages to the user may be filtered, limited, or halted. For example, targeted marketing email messages may be halted but generic email messages may be allowed.

Alternatively or additionally, shipping and order confirmation email messages may be held until the customer provides or confirms an email address. To ensure that the user's account returns to full functionality as soon as possible, a notice may be sent to the checkout system to prompt the user to confirm their email address the next time they checkout on the system. Similarly, notifications may be sent to other dependent services associated with the vendor or operator, such as social networking affiliated sites. For example, the site of interest may have a social networking site as an affiliated site, and both may allow a user to login with the same credentials via an open authorization protocol such as OAuth 2.0. In this way, the user may be logged into the affiliated site through the merchant site, and the merchant site is also able to message the user via the affiliated site.

Alternatively or additionally, transaction 6 may entail the verifier service 201 informing the data store 205 to set a secondary user email address as a primary email address for that user. This secondary email address may or may not also be tested in an embodiment. It will be appreciated that verifier service 201 may change user account data 206 in the data store 205 either by instructing that the necessary change be made or by making the necessary change, depending upon the protocol under which the data store 205 stores the user account data 206.

Figure 3:
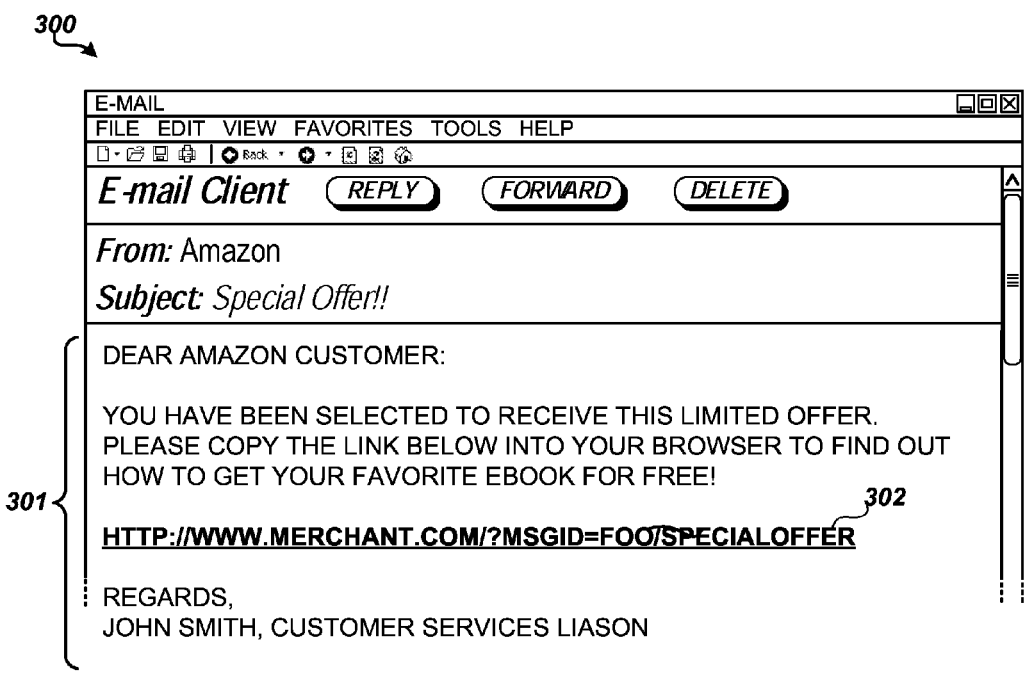
FIG. 3 is a drawing of an example email message used within an embodiment of the described principles.

As discussed above, the email message sent to test user email addresses is instrumented with a selectable link that, when activated, invokes a landing page and directly or indirectly identifies the recipient email address from which the activation originated. An example of such an email message is shown in FIG. 3. The illustrated verification message 300 is shown in the form of a customized special offer email message offering the user a free eBook. It will be appreciated that the email message may comprise any desired message. As noted above, modifying an already-planned email message to include the instrumented link allows the verification to be carried out without causing additional user inconvenience and with little additional operator overhead. Thus, for example, marketing email messages (sales, new products, fixes, and so on) and notification email messages (coupons to expire, new coupons out, low stock on items on wish list, etc.) may be used to embed the instrumented link for verification.

It will be appreciated that although the actual content of the verification message 300 is set by the sender, the presentation of that content, including pagination, sender and recipient data format, function keys, and so on will typically depend on the client email program. Thus, while the illustrated verification message 300 shows certain common presentation features, these are included for purposes of illustration and are not meant to limit the disclosure.

The salient content of the illustrated message 300 includes a textual portion 301 and an instrumented selectable link 302. The textual portion 301 of the verification message 300 is not required, but may be used to explain the purpose of the instrumented selectable link 302 to the recipient as shown. It will be appreciated that while the selectable link 302 is described as selectable, it may be any form of link or code that can be customized and that can link the user to a site, e.g., a scannable QR code, bar code, or alphanumeric code. In an embodiment, the verification link is sent to the user via a channel other than email or SMS. For example, if a customer is known to be outside of a certain retail location, the operator may present a custom advertisement to the user, including the verification link in that custom advertisement, and ask the user to log in after scanning a QR code in the advertisement. In an alternative embodiment, the verification message is, or is embodied in, a physical item. For example, a coupon or gift card bearing a customized QR code may be included in a package or magazine sent to the user.

The text of the selectable link 302 may be any desired text, such as the top level domain name of the landing page. However, the underlying link code also contains a property that is passed to the landing page. This property may be, for example, an urchin tracking module (UTM), a Snowplow query string, a campaign tracker, or other user-invisible embedded property that is readable by the host server independently from the resource identification function of the link.

Thus, in the illustrated example, the visible text of the selectable link 302 is http://www.merchant.com/?msgid=foo/specialoffer. Similarly, the underlying link code may be, for example, of the form http://www.example.com/ . . . utm_source=[encoded link to specific registered email address] using UTM. Further aspects of the instrumented selectable link 302 will be discussed with respect to the example shown in FIG. 4. While the instrumentation of the link 302 is shown in this example, such is not required in all cases.

Figure 4:
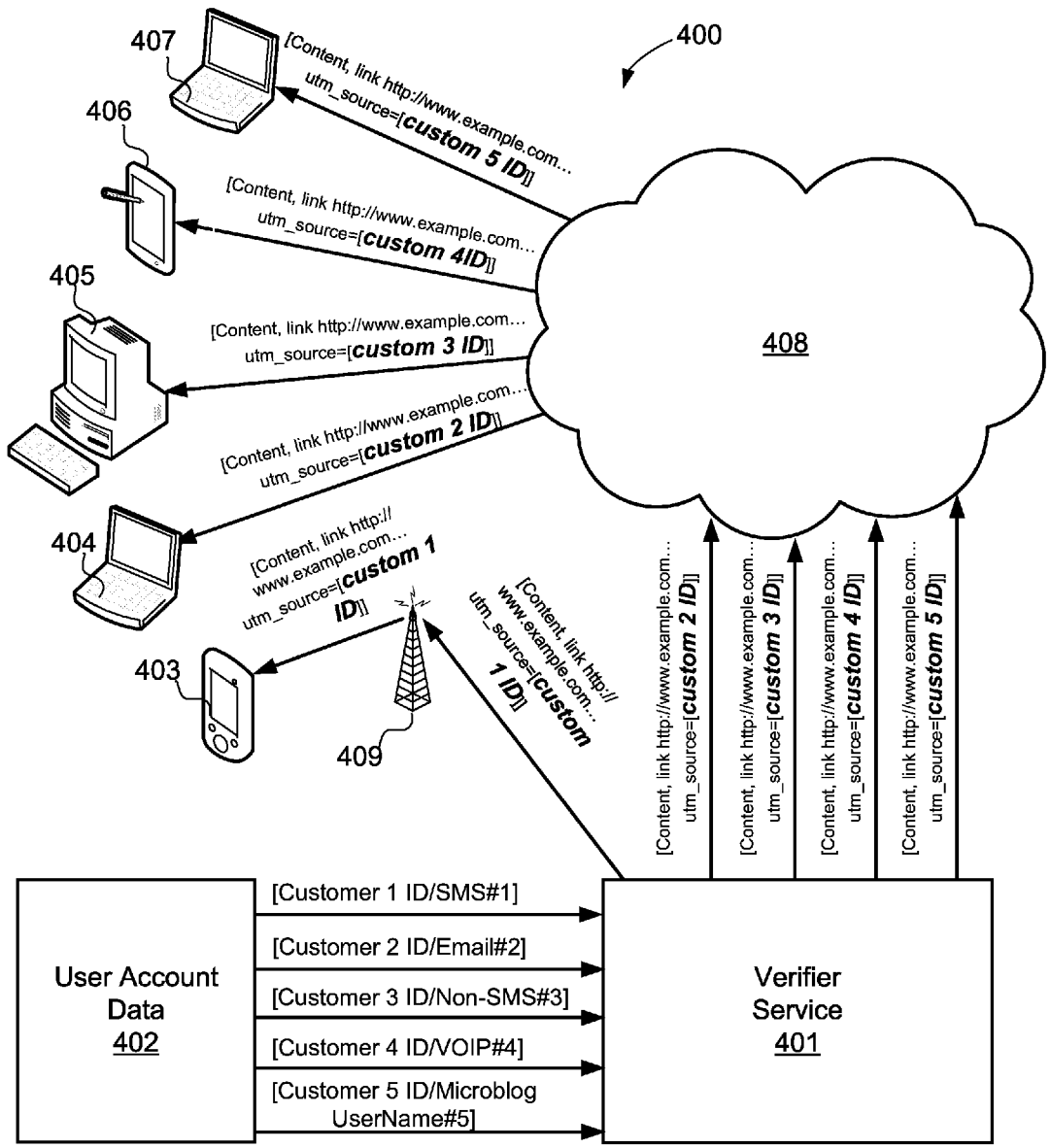
FIG. 4 is service and device level diagram showing an example message flow in keeping with an embodiment of the described principles.

FIG. 4 shows an example of message flow at a service and device level in accordance with an embodiment of the described principles. As noted previously, the verifier service 401 (FIG. 2, 201) functions to verify registered user contact paths in user account data 402 maintained by the operator, e.g., an ecommerce vendor. Thus, the verifier service 401 accesses the user account data 402 to retrieve a plurality of contact paths (e.g., email address, cellular telephone number, non-SMS text number, VOIP number, micro blog handle, user name for direct message) and associated user identifiers. The pairings of customer IDs and contact paths are shown as [Customer n ID/ContactPathn].

Although five such pairings are shown in the illustrated example, it will be appreciated that any number of pairings may be retrieved as needed. However, in the rare case that only a single email address is to be verified at a given time, it may be unnecessary to take extra measures to identify the recipient clicking on an embedded link; the click will be known to have originated from the single tested email address. In other words, if only a single instrumented email message is sent, then any resultant click based on a link in that email message had to have come from the tested email address. In general, the format of the email address/user identifier pairings may include, for example, a table, a linked list, an array, or other suitable format.

The verifier service 401 then processes the retrieved pairings to verify the registered contact paths by instrumenting a link in an email message for transmission to each contact path to be verified. Each email message includes content and an instrumented link, shown in this example as http://www.example.com . . . utm_source=[custom n ID], and illustrated in FIG. 3 above. The various messages are then sent and are retrieved by various user devices 403, 404, 405, 406, 407 over one or more networks 408 by standard messaging, texting or email mechanisms. In the case of SMS messaging, for example, or for any devices communicating via cellular connectivity at the time the message is retrieved by the device, the message may traverse one or more cellular towers 409 in addition to other networks before reaching the intended recipient device. As illustrated, the user devices 403, 404, 405, 406, 407 may take any suitable form including any of a laptop, desktop, or tablet computing device, or a smart phone or other portable communications device.

The structures and messaging discussed above can be facilitated via computer-executable instructions read from a computer-readable media and executed by a processor, such as may be used by the operator server 101 or other computing device involved in the verification process. The computer-readable media may be any memory, whether digital or analog, optical or magnetic, electrostatic or electrodynamic, in which data can be stored and from which data can be read by an electronic computing device.

The term "non-transient" when used as a modifier to such media denotes media that are physically embodied in a fixed form, e.g., a disc or device, as opposed to in an ephemeral form, e.g., an electronic or electromagnetic wave. Specific examples of non-transient computer-readable media include, without limitation, optical and magnetic disc drives, flash memories, disc arrays, solid state memories, EEPROMs, and other physically embodied memory devices and structures.

The computer-executable instructions stored in this manner may be stored as a unitary body or as separate linked or inter-referenced code bodies, and may include or be linked to any necessary data, e.g., parameters, initialization values, and so on. Other memory, whether non-transient or otherwise, may be utilized to store the instructions for execution as well as to store process values during execution and to record results after execution. For example, the user account data 402 may be modified by the verifier service 401 during execution of the verification process.

Figure 5A:
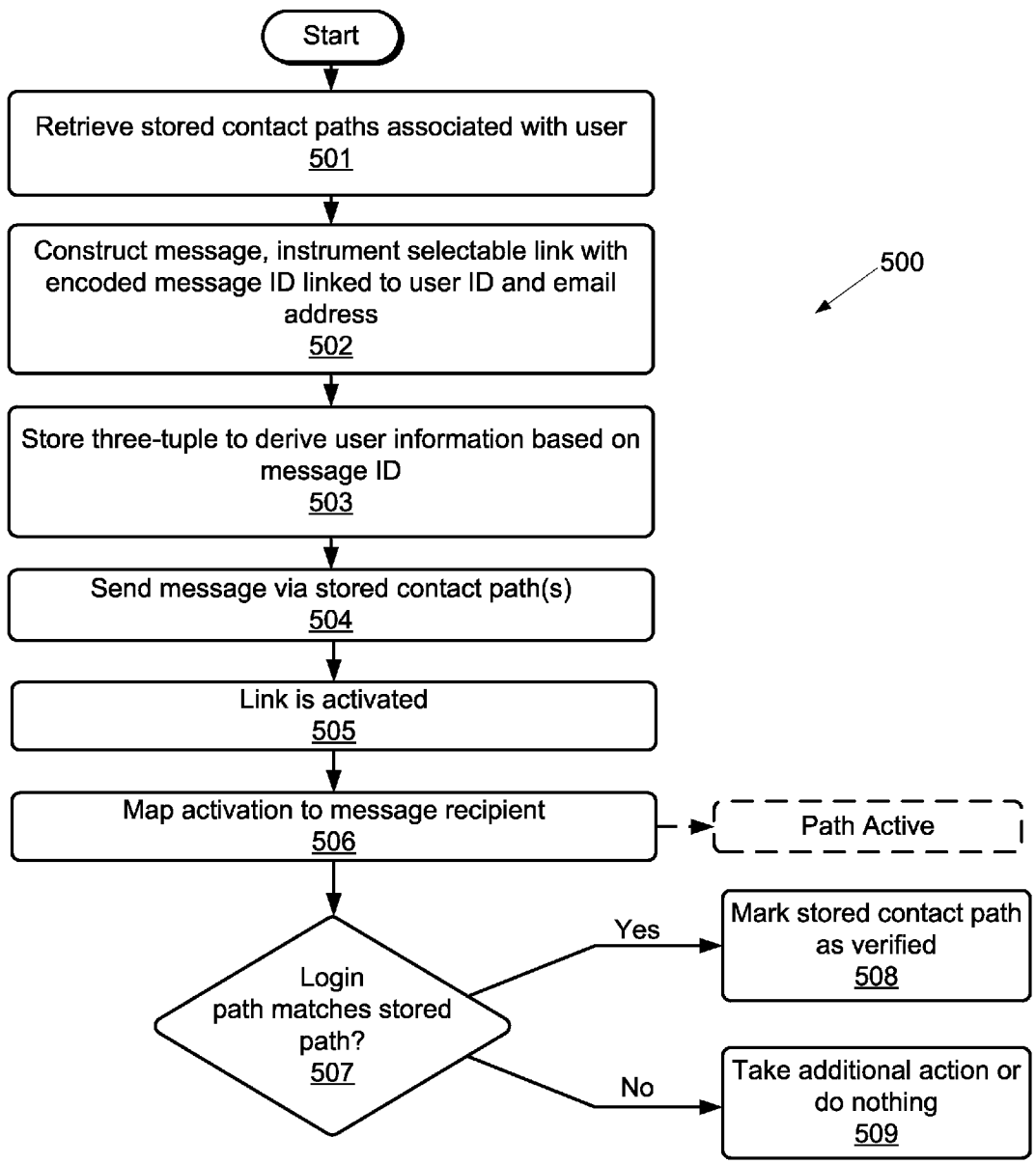
FIG. 5A is a flowchart showing a method according to an embodiment for verifying that a contact path is still active and still associated with a known entity in accordance with an embodiment of the described principles.

Example verification process steps or instructions are shown in flow chart form in FIG. 5A. While the example shown in FIG. 5A lists the steps of an example in a particular order, it will be appreciated by those of skill in the art that the steps may be performed in any suitable order and/or in parallel where no conflict arises. The flow chart 500 begins at stage 501, wherein a registered email address or other contact path associated with a user is retrieved. Using the architecture shown in FIG. 4 as an example, this step may be performed by the verifier service 401 either directly or by way of an intermediary.

A verification message including a selectable link is constructed at stage 502, and is instrumented with the selectable link to include an identification of the registered contact path associated with the user. This step may be executed by the verifier service 401 or may be outsourced by the verifier service 401 to another logical unit or machine. In an embodiment, this identification information includes the contact path itself, whereas in an alternative embodiment, the identification information includes only information usable to retrieve the contact path, e.g., an encoded message ID or other information.

The association between the message ID and the user account may then be stored at stage 503 so that any changes resulting from the verification process can be implemented. The verifier service 401 may execute the storage of the association data, and in an embodiment the association data may be stored at a location remote from the hardware device running the verifier service 401, such as on a networked database. At stage 504, the message having the instrumented link is transmitted to the user via the registered contact path by the verifier service 401 or by way of a proxy or intermediary instructed or utilized by the verifier service 401. At this point there are two items of information that are not yet verified, namely whether the contact path is still active and whether the contact path, if active, is still controlled by the user in question.

In the event that the contact path under test is still active, then a hit on the landing page based on link activation, e.g., due to clicking of the link by the recipient of the verification message or automatic retrieval based on a cookie, is received at stage 505 of the process 500. As noted in the discussion of FIG. 2, the landing page need not be hosted by the verifier service 401. However, in the event that the landing page is not hosted by the verifier service 401, the hosting entity, e.g., an operator server, may forward the instrumented link or the identifying data from the hit to the verifier service 401. Thus, at stage 506 of process 500, the message ID is extracted from the link and used to identify the associated customer ID or email address.

As noted above, the message recipient may then log into their account using either a contact path (e.g., an email address) or a name or identifier associated with a contact path. When the recipient logs into their account the login contact path or associated identifier is passed to the verifier service 401 as well.

At stage 507, the registered contact path associated with the user account is compared to the login contact path used to log into the account. This comparison step may be executed by, or caused to be executed by, the verifier service 401. If the registered contact path matches the login contact path, then the registered contact path is marked as verified at stage 509, meaning that the registered contact path is both active and controlled by the registered user. Conversely, if the registered email address does not match the login email address, then the verifier service 401 may leave the registered email address as it currently is, that is, unverified, or it may take additional steps as discussed elsewhere herein to limit account activities using that path.

A contact path that is unverified may generate one or more consequences. For example, in an embodiment, an unverified contact path may remain valid for login if the user has displayed a pattern of logging in with the login email address even though the login email address is not a primary registered contact path. Alternatively, an account having an unverified contact path may be restricted such that no access is allowed until a verified contact path is established or such that security-related account features are inaccessible via the unverified contact path.

Figure 5B:
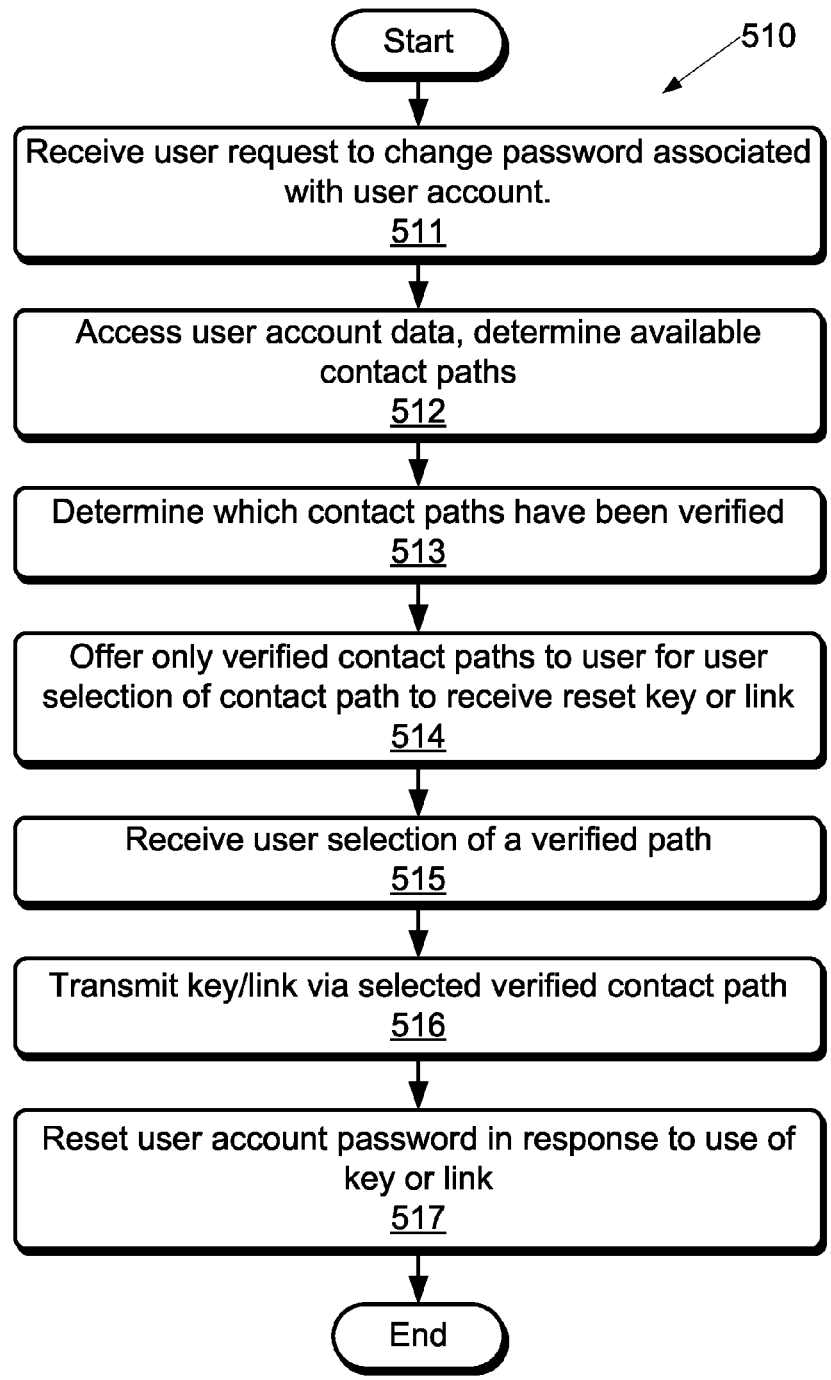
FIG. 5B is a flowchart showing a method of password reset according to an embodiment of the described principles.

FIG. 5B is a flowchart showing a method of password reset according to an embodiment of the described principles. In the illustrated example, a user attempts to reset his or her account password for any number of reasons, e.g., they have forgotten it or prefer another. The user has multiple registered contact paths, but only one contact path has been verified through the process described herein.

At stage 511 of the process 510, an online operator receives, via a web site for example, a user request to change the user's account password. The user is not currently logged in. The operator accesses the user's account data at stage 512 to determine available contact paths, and at stage 513 determines which contact paths have been verified. At stage 514 of the process 510, the operator offers only the verified contact paths to the user for user selection of a contact path via which to receive a reset key or link.

A user selection of a verified path is received at stage 515. The operator transmits the required key or link to the user via the selected verified contact path at stage 516. Finally, the operator resets the user account password at stage 517 in response to the user employing the received key or link to change his or her account password.

While ecommerce vendors have an interest in maintaining accurate contact path information since much of their business is generated online, more traditional commercial entities may also need to ensure that digital contact paths for customers remain valid so that advertising and other materials are being sent to the intended audience, both to minimize waste and to maximize the impact of advertising spend. Registered contact paths may also risk becoming stale for businesses that, by their nature, see only seasonal or infrequent traffic to their sites, e.g., professional society sites, tax preparation sites, vacation sites, and so on. To this end, various embodiments of the disclosed principles may be used to provide contact path verification as a service to third parties.

Figure 7:
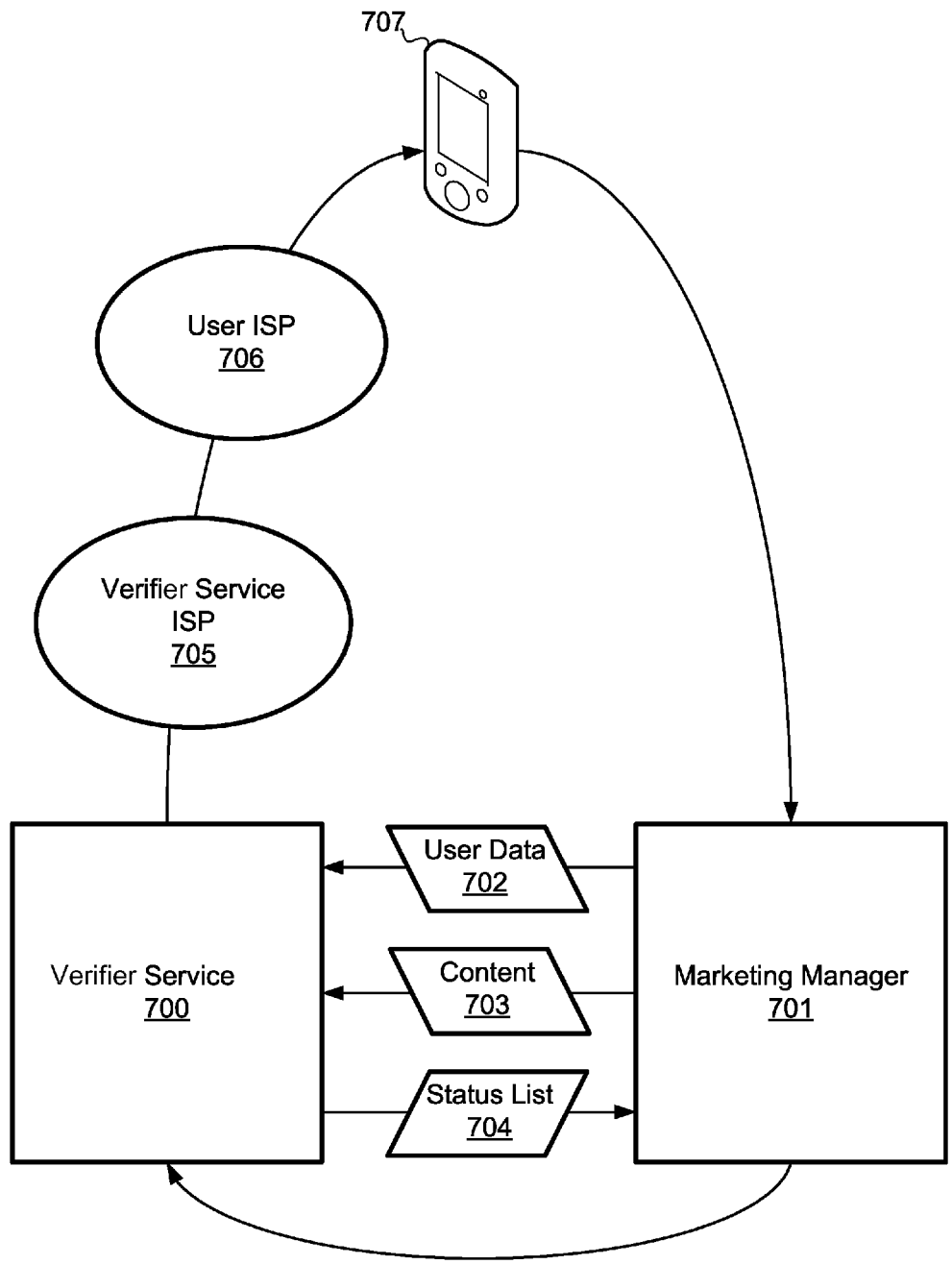
FIG. 7 is a schematic diagram showing an architecture and message flow in accordance with an embodiment of the described principles.

In these embodiments, in overview, the verifier service 700 may employ a verification architecture as shown in FIG. 7 to process contact path data and message content provided by a third party customer, e.g., the marketing manager of a traditional business establishment. For its part, the marketing manager 701 provides a customer list 702 including contact paths and the message content 703, which includes a selectable link (not yet instrumented). The verifier service 700 prepares a customized message for each identified user by instrumenting the selectable link to identify the user/contact path, sends the customized messages, and tracks the results to create a status list 704 for return to the marketing manager 701.

Figure 6:
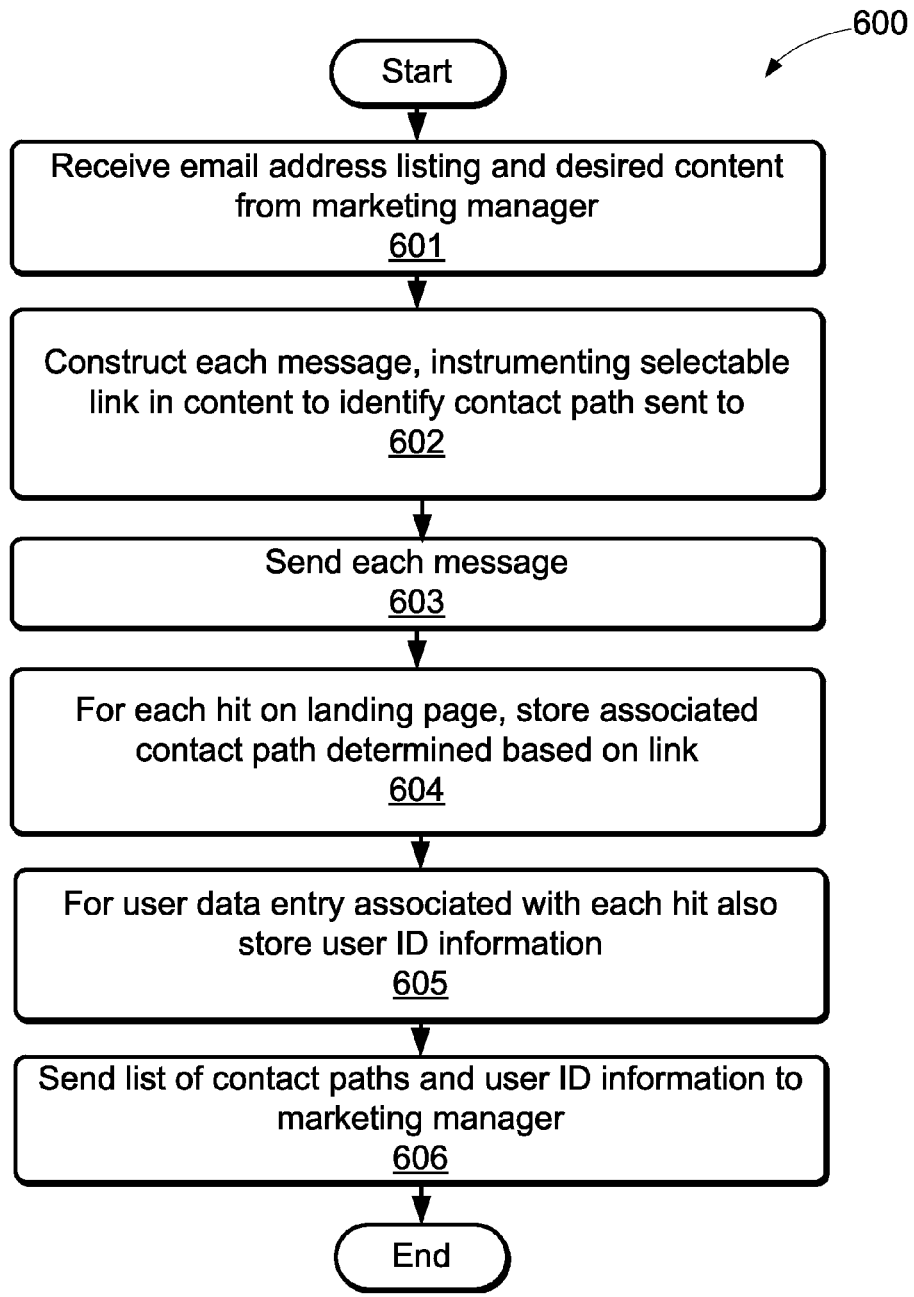
FIG. 6 is a flowchart showing a method for providing user contact path verification as a service in accordance with an embodiment of the described principles.

The flow chart 600 of FIG. 6, to be discussed in conjunction with the architectural schematic illustration of FIG. 7, illustrates this process in greater detail. Since the verification is offered by the verifier service 700 as a service to the marketing manager 701, the marketing manager 701 first provides the contact path list 702 of paths to be verified as well as the desired content 703 to the verifier service 700. Thus a contact path listing and the desired advertising content are received from the marketing manager by the verifier service 700 at stage 601 of the process. In an embodiment, these materials are received automatically at a verifier service module such as verifier service 201 of FIG. 2 hosted by the verifier service 700 or at a computing device or storage device linked or linkable to the verifier service 700.

A message is then constructed at stage 602 for a plurality of the listed contact paths (e.g., all of the listed email addresses), including instrumenting the selectable link in each message to identify the contact path to which the message is being sent. The message may be constructed by the verifier service 700 or may be constructed by another entity pursuant to instructions from the verifier service 700. The constructed messages are transmitted via the respective contact paths at stage 603. This step may entail transmission by or on behalf of the verifier service 700 by way of the verifier service's ISP 705 and each user's ISP 706.

As a user in receipt of the message at his or her device 707 selects the instrumented link (or the link is otherwise activated, e.g., via image retrieval), a hit on the linked landing page (request for the page) is detected and the encoded user ID-mapped information associated with the request is stripped, parsed or otherwise read out of the instrumented link. In an embodiment, the verifier service 700 hosts or is linked to the landing page so as to directly receive hit data, whereas in an alternative embodiment, the third party business hosts the landing page and transmits hit data to the verifier service 700. Regardless, the verifier service 700 stores a recipient contact path associated with each request at stage 604.

As with the prior examples, one or more users requesting the landing page may further login at the page by providing certain data including a login contact path. For each such login, the login contact in association with the user ID information used to log in are stored at stage 605, e.g., by the verifier service 700. Using this data, a user ID listing or status listing is created for the marketing manager at stage 606 showing the registered contact path for each user, and indicating whether the contact path has been verified as active. For those contact paths verified as active, the listing may further contain an indication of any login contact path that differs from the registered contact path.

Although no further action is required, the customer may choose to update their mailing list based on this information, or the verifier service 700 may provide an update service to the customer. In an embodiment, the verifier service 700 provides a periodic update service to the customer.

As noted above, although numerous examples herein use email addresses and email messages to exemplify user contact path types and messaging mechanisms, it will be appreciated that other contact path types such as SMS, non-SMS texting, instant messaging, micro blog messaging and so on may be used as well. Indeed, in an alternative embodiment, in-application messaging is utilized to confirm continued viability of the contact path.

Figure 8:
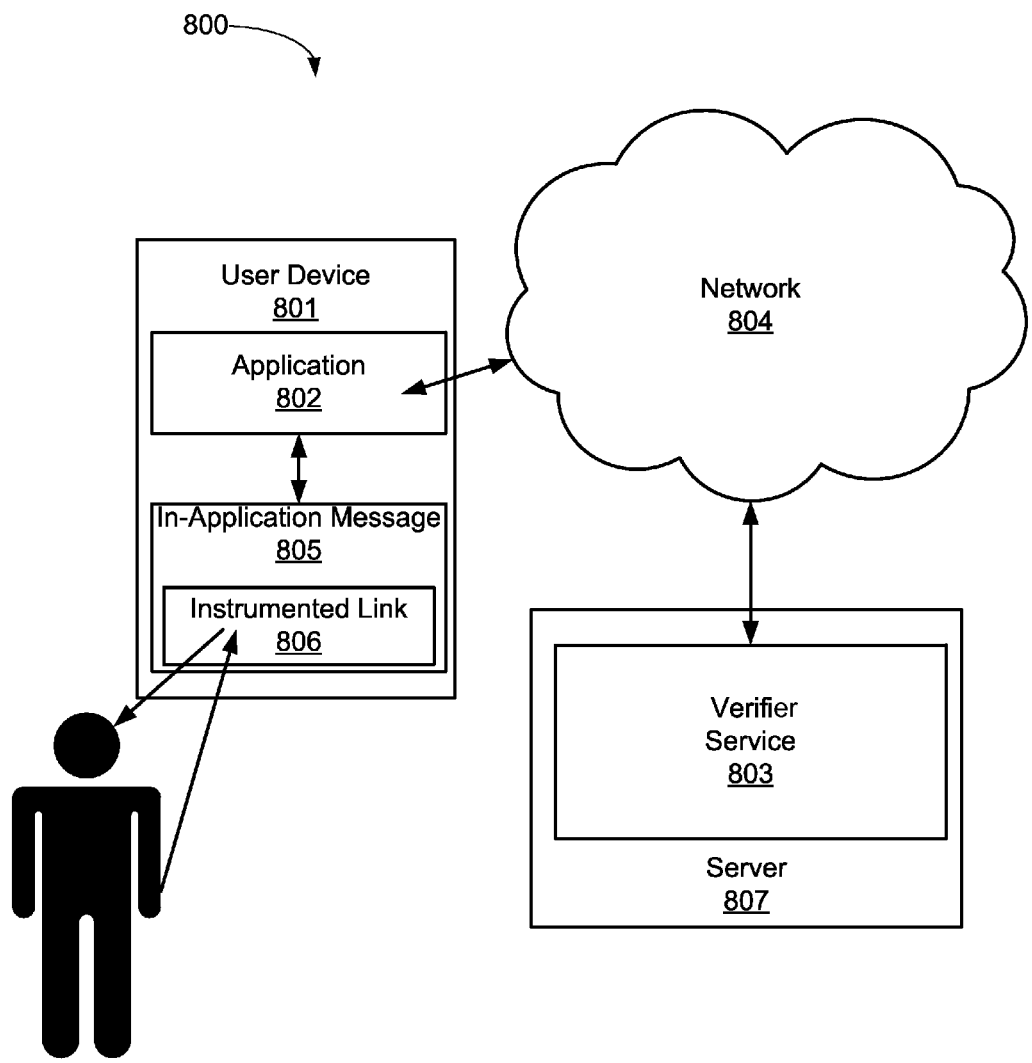
FIG. 8 is a simplified modular drawing of an architecture usable in an embodiment of the disclosed principles.

Referring to FIG. 8, this figure shows a simplified modular drawing of an in-application messaging architecture usable in an embodiment of the disclosed principles. The illustrated architecture includes, as basic elements, a user device 801, a server 807, and a network 804 facilitating communication between the user device 801 and the server 807.

The user device 801 hosts an application 802 that may utilize content from, or otherwise interact with, one or more other remote entities such as servers. For example, the application 802 may be a book reading application that receives displayable content from the server 807 or from another source of content pursuant to a subscription plan or other paid plan. In order to ensure that all users of content are paid subscribers, the operator of such a plan service may periodically wish to verify that the application 802 is present on the user device 801 and that the device 801 is still controlled by the paid user.

As previously noted in connection with another embodiment, the decision to verify a contact path may be made based on account content type/content amount, elapsed time since last verification, or other suitable metric. In whatever way the decision to verify the contact is made, a verifier service 803 hosted on server 807 or elsewhere may use in-application messaging for purposes of verification.

In particular, in the illustrated example, the verifier service 803 hosted on server 807 prepares an in-application message 805 having an embedded user-selectable instrumented link 806 similar to that discussed with respect to the email message embodiments. The in-application message 805 is sent to the user via user device 801 and in particular, via the application 802, over the network 804.

If the user sees the message 805 and clicks the instrumented link, they may be shown a verification page that has been requested from the server 807 pursuant to the link 806. In addition, the link instrumentation causes the verifier service 803 to receive an indication that the instrumented link has been selected within that application instance 802 on that user device 801.

In response, the verifier service 803 may flag the application instance 802 as still present and verified. If a hit is not received from that application instance 802 within a predetermined period of time after the verification message containing the instrumented link is sent, then the verifier service 803 may flag the application instance 802 as compromised or not responsive. In this case, the verifier service 803 may additionally disallow or disable one or more account features such as password reset, purchase based on stored credit card data, and so on, and/or may require that all future user communications are execute in application rather than by another contact path.

Figure 9:
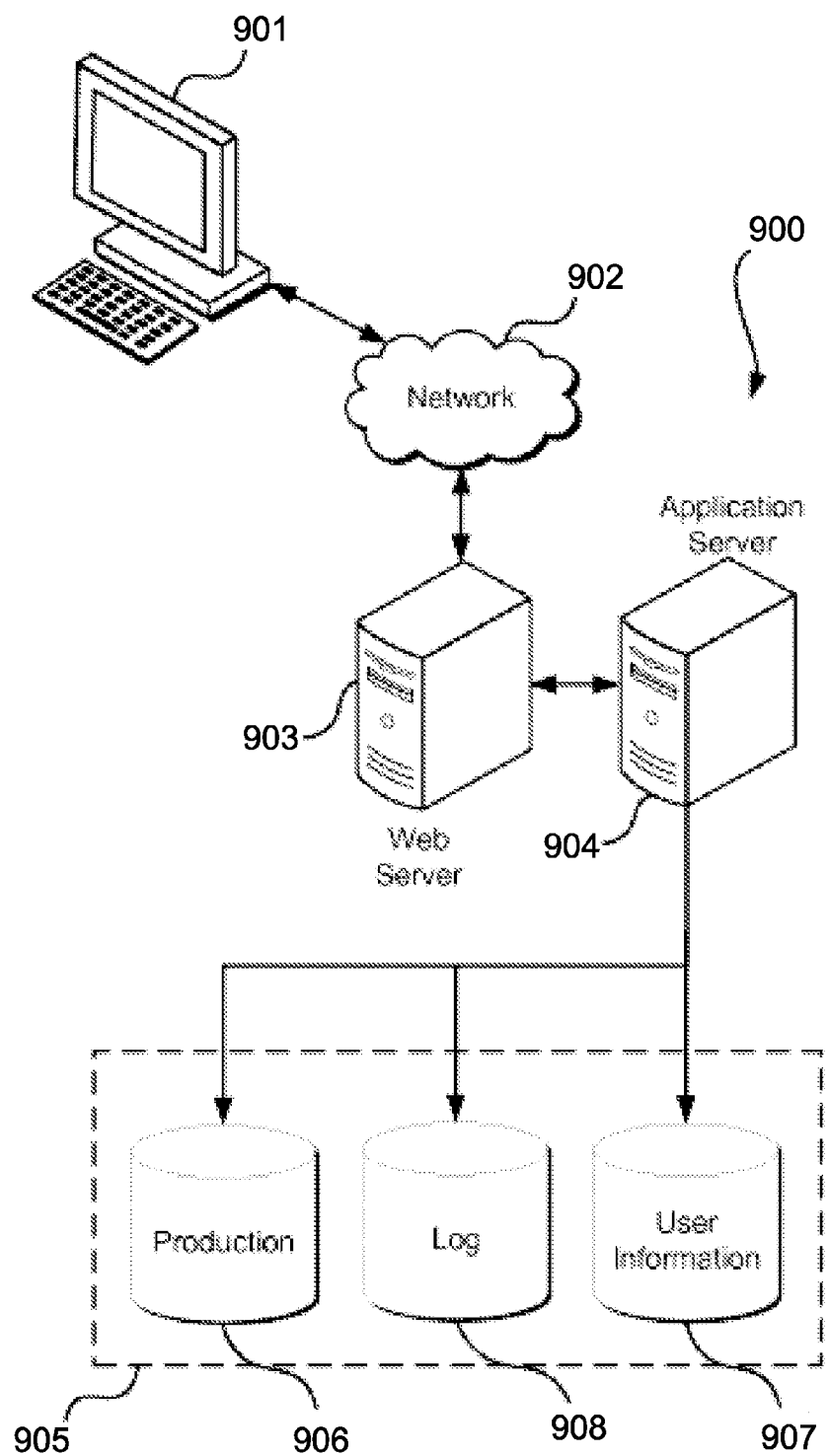
FIG. 9 is a generalized schematic of a network environment within which various embodiments of the disclosed principles may be implemented.

Although various hardware systems and network architectures may be used to implement the disclosed principles, FIG. 9 illustrates aspects of an example environment 900 for implementing aspects of the disclosed principles. As will be appreciated, although a web-based environment is used for purposes of explanation, different communications environments may be used, as appropriate, to implement various embodiments. The environment includes an electronic client device 901, which can include any appropriate device operable to send and/or receive requests, messages or information over an appropriate network 902 and, in some embodiments, convey information back to a user of the device 901. Examples of such client devices 901 include personal computers, cell phones, handheld messaging devices, laptop computers, tablet computers, set-top boxes, personal data assistants, embedded computer systems, electronic book readers and the like.

The network 902 can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network 902 includes the Internet, as the environment includes a web server 903 for receiving requests and serving content in response thereto, although for other networks an alternative device serving a similar purpose could be used as would be apparent to one of ordinary skill in the art.

The illustrative environment includes at least one application server 904 and a data store 905. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment.

The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of Hypertext Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 2402 and the application server 2408, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device or machine may, unless otherwise clear from context, be performed collectively by multiple devices or machines, which may form a distributed and/or virtual system.

The data store 905 can include several separate data tables, databases, data documents, dynamic data storage schemes and/or other data storage mechanisms and media for storing data relating to a particular aspect of the present disclosure. For example, the illustrated data store may include mechanisms for storing production data 906 and user information 907, which can be used to serve content for the production side, e.g., status lists and the like. The data store also is shown to include a mechanism for storing log data 908, which can be used for reporting, analysis or other such purposes. It should be understood that there can be other aspects that may need to be stored in the data store, such as page image information and access rights information, which can be stored in any of the above listed mechanisms as appropriate or in additional mechanisms in the data store 905. The data store 905 is operable, through logic associated therewith, to receive instructions from the application server 904 and obtain, update or otherwise process data in response thereto. The application server 904 may provide static, dynamic or a combination of static and dynamic data in response to the received instructions.

Dynamic data may be generated by server-side structured languages as described herein or may be provided by a content management system ("CMS") operating on, or under the control of, the application server. Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

It will be appreciated that new and inventive systems and techniques have been disclosed for improving user account safety and communications. However, it should be noted that this description is not exhaustive, in that only certain embodiments have been set forth; alternatives and modifications will be apparent to those skilled in the art upon reading the above description. These and other alternatives are considered equivalents and within the spirit and scope of this disclosure and the appended claims.

The invention claimed is:

1. A computer-readable medium having stored thereon computer-executable instructions for verifying a registered email address associated with a registered user account, the computer-executable instructions comprising:
   instructions for receiving, at a verification service from a sender, the registered email address and message content including a link to deliver a landing page to the registered email address, the link providing a message ID to identify the registered email address receiving an email message;
   instructions for causing, by the verification service, the email message to be transmitted to the registered email address, the email message including the message content and the link configured to deliver the landing page to the registered email address;

instructions for causing data associated with the landing page to be transmitted to a device associated with the recipient;

instructions for identifying, the registered email address of the recipient receiving the message based on the message ID;

instructions for detecting, by the verification service, that the recipient associated with the registered email address has logged in at the landing page by entering a login email address;

instructions for determining, by the verification service, the login email address entered by the recipient matches the registered email address from the email message transmitted to the recipient;

instructions for, in response to determining, by the verification service, that the registered email address and the login email address match, marking the registered email address as verified as being associated with the registered user account of the recipient; and instructions for providing verification data to the sender indicating that the registered email address has been verified.

2. The computer-readable medium in accordance with claim 1, further comprising instructions for identifying, by the sender, one or more other user accounts associated with the registered email address and instructions for the verification service to attempt to verify the association of the registered email address with one or more other registered user accounts.

3. The computer-readable medium in accordance with claim 1, further comprising instructions for disabling, by the sender, a feature associated with the registered email address of the recipient if the registered email address of the recipient and the login email address do not match.

4. The computer-readable medium in accordance with claim 3, wherein the feature associated with the registered email address of the recipient comprises a password reset function.

5. The computer-readable medium in accordance with claim 3,
further comprising instructions for automatically reattempting, by the verification server, to verify the registered email address of the recipient that has not been verified, and for, in response to receiving by the sender the verification data indicating verification of the registered email address of the recipient occurred, re-enabling, by the sender, the disabled feature.

6. The computer-readable medium in accordance with claim 1, wherein the instructions for causing, by the verification service, the email message to be transmitted to the registered email address include instructions for identifying the registered user account as being at risk and therefore selecting, by the sender, the registered email address of the recipient for verification, wherein identifying the registered user account as being at risk includes determining, by the sender, that a measure of content associated with the registered user account exceeds a threshold measure of content.

7. The computer-readable medium in accordance with claim 6, wherein the instructions for selecting, by the sender, the registered email address of the recipient for verification, wherein identifying the registered user account as being at risk includes instructions for establishing, by the sender, a verification schedule for the registered email address, to be implemented by the verification service, based on the identification of the registered user account as being at risk.

8. A method of verifying a registered contact path associated with a user account registered to a user, the method comprising:
receiving, at a verification service from a sender, the registered contact path and message content including a link to deliver a landing page to the registered contact path, the link providing a message ID to identify the registered contact path receiving a message when the link is activated;

generating, at the verification service, the message, using the message content and the link, to send to the registered contact path;

causing, by the verification service, transmission of the message to a recipient user via the registered contact path;

receiving, by the verification service, an indication that the link has been activated;

receiving, by the verification service, a contact path associated with user login data for the user account of the recipient user;

responsive to receiving the indication that the link has been activated and to receiving the contact path associated with the user login data for the user account of the recipient user, determining, by the verification service, whether the registered contact path matches the received contact path associated with the user login data;

responsive to determining that the registered contact path matches the received contact path associated with the user login data, marking, by the verification service, the registered contact path as verified to indicate the registered contact path is associated with the user account of the recipient user; and providing verification data to the sender indicating that the registered contact path has been verified.

9. The method in accordance with claim 8, wherein the registered contact path is a mobile telephone number and wherein the message is an SMS message.

10. The method in accordance with claim 8, wherein the registered contact path is an email address and wherein the message is an email message.

11. The method in accordance with claim 8, further comprising marking the registered contact path as unverified if it is determined that a login contact path and the registered contact path are not the same and providing verification data to the sender indicating that the registered contact path is unverified.

12. The method in accordance with claim 11, further comprising modifying, by the sender, communications with the user if the registered contact path is marked as unverified.

13. The method in accordance with claim 8, wherein the registered contact path includes an application on a device associated with the user, and wherein the message comprises an in-application message.

14. The method in accordance with claim 13, wherein determining that the registered contact path is active comprises flagging the application instance as present if the in-application message was received at the application instance, and otherwise flagging the application instance as not present.

15. The method in accordance with claim 14, further comprising requiring future communications with the user to be by an alternative contact path when the application instance has been flagged as not present.

16. A system, comprising:
at least one computing device configured to implement one or more services including a verification service, wherein the one or more services are configured to:
receive and store, by the verification service, message content that includes a link to deliver a landing page and an identification of a plurality of intended message recipients from a customer, individual ones of the message recipients being associated with respective messaging contact paths;
construct, by the verification service, a message for a plurality of the messaging contact paths using the message content from the customer, the message for the plurality of messaging contact paths having therein the link, the link directing message recipients associated with the respective messaging contact paths receiving the message to a landing page and having a property usable to identify the respective messaging contact paths receiving the message;
cause the message for the plurality of messaging contact paths to be transmitted, by the verification service, to the message recipients via the respective messaging contact paths;
receive, by the verification service, a plurality of hits on the landing page from the message recipients associated with the respective messaging contact paths and extract, by the verification service, the property from the hits identifying the respective messaging contact paths;
receive, by the verification service, a respective login contact path associated with at least a subset of the messaging contact paths associated with message recipients representing the plurality of hits;
compare, by the verification service, the respective login contact path with the subset of the messaging contact paths associated with the message recipients representing the plurality of hits;
identify, by the verification service, messaging contact paths that differ from their respective login contact paths;
determine, by the verification service, the messaging contact paths and the login contact path that match;
mark the messaging contact paths matching the login contact path as verified to indicate the message recipients control the respective messaging contact paths; and
provide verification data to the customer indicating that the respective messaging contact paths have been verified to be controlled by the message recipients.

17. The system in accordance with claim 16, wherein at least a subset of the respective messaging contact paths are email addresses.

18. The system in accordance with claim 16, wherein at least a subset of the respective messaging contact paths are mobile telephone numbers.

19. The system in accordance with claim 16, wherein the verification service is further configured to transmit an identification of messaging contact paths that differ from their respective login contact paths to the customer.

20. The system in accordance with claim 16, wherein the property is encoded in the link via one of an urchin tracking module, a query string, or a campaign tracker.

* * * * *